(12) United States Patent
Heng et al.

(10) Patent No.: US 8,108,803 B2
(45) Date of Patent: Jan. 31, 2012

(54) GEOMETRY BASED ELECTRICAL HOTSPOT DETECTION IN INTEGRATED CIRCUIT LAYOUTS

(75) Inventors: Fook-Luen Heng, Yorktown Heights, NY (US); Xu Ouyang, Hopewell Junction, NY (US); Yunsheng Song, Hopewell Junction, NY (US); Yun-Yu Wang, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/603,594

(22) Filed: Oct. 22, 2009

(65) Prior Publication Data

US 2011/0099529 A1   Apr. 28, 2011

(51) Int. Cl.
   *G06F 17/50*   (2006.01)
(52) U.S. Cl. ............... 716/50; 716/52; 716/54; 716/112
(58) Field of Classification Search .................. 716/50, 716/52, 54, 112
   See application file for complete search history.

(56) References Cited

U.S. PATENT DOCUMENTS

| | | | | |
|---|---|---|---|---|
| 5,592,392 | A * | 1/1997 | Matheson et al. | 716/119 |
| 6,204,542 | B1 * | 3/2001 | Kinoshita et al. | 257/401 |
| 6,599,804 | B2 * | 7/2003 | Bulucea et al. | 438/301 |
| 6,867,475 | B2 * | 3/2005 | Yoshimura | 257/531 |
| 7,194,704 | B2 | 3/2007 | Kotani et al. | |
| 7,784,019 | B1 * | 8/2010 | Zach | 716/53 |
| 7,879,669 | B1 * | 2/2011 | Teng et al. | 438/217 |
| 7,919,792 | B2 * | 4/2011 | Law et al. | 257/206 |
| 2002/0158299 | A1 * | 10/2002 | Castro Simas et al. | 257/499 |
| 2003/0166323 | A1 * | 9/2003 | Vietzke et al. | 438/299 |
| 2003/0220770 | A1 * | 11/2003 | Eikyu | 703/1 |
| 2008/0072199 | A1 * | 3/2008 | Yamashita et al. | 716/6 |
| 2011/0089499 | A1 * | 4/2011 | Nayfeh et al. | 257/408 |
| 2011/0173577 | A1 * | 7/2011 | Chuang et al. | 716/53 |

OTHER PUBLICATIONS

A.R. Farhang et al.; "Co-optimization of Product Design and Semiconductor Process Technology: The Core of a Winning DFM Strategy;" Future FAB International, Isuue 22; Jan. 9, 2007; pp. 40-44.
F.L. Heng et al.; "Toward Through-Process Layout Quality Metrics;" Proc. SPIE Design and Process Integration Conference, Feb. 2005.

* cited by examiner

*Primary Examiner* — Naum Levin
(74) *Attorney, Agent, or Firm* — Cantor Colburn LLP; Daniel Schnurmann

(57) ABSTRACT

A method of failure detection of an integrated circuit (IC) layout includes determining a critical path distance between a first geometric feature of the IC layout and a second geometric feature of the IC layout; and comparing the determined critical path distance to a defined minimum critical path distance between the first and second geometric features, wherein the defined minimum critical path distance corresponds to a desired electrical property of the IC layout, independent of any geometric-based ground rule minimum distance for the IC layout; identifying any determined critical path distances that are less than the defined minimum critical path distance as a design violation; and modifying the IC layout by eliminating the identified design violations.

10 Claims, 5 Drawing Sheets

GEOMETRY BASED ELECTRICAL HOTSPOT DETECTION IN INTEGRATED CIRCUIT LAYOUTS

BACKGROUND

The present invention relates generally to integrated circuit device design techniques and, more particularly, to failure detection of integrated circuit layouts through a geometry-based, electrical hotspot detection technique.

In designing an integrated circuit (IC), engineers or designers typically rely on computer design tools to help create an IC schematic or design, which can include a multitude of individual devices, such as transistors, coupled together to perform a certain function. To actually fabricate the IC in or on a semiconductor substrate, the IC schematic must be translated into a physical representation or layout, which itself can then be transferred onto a semiconductor substrate. Computer aided design (CAD) tools can be used to assist layout designers with translating the discrete circuit elements into shapes, which will embody the devices themselves in the completed IC. These shapes make up the individual components of the circuit, such as gate electrodes, diffusion regions, metal interconnects and the like.

The software programs employed by the CAD systems to produce layout representations are typically structured to function under a set of predetermined design rules in order to produce a functional circuit. Often, the design rules are determined by certain processing and design limitations based roughly on the patternability of layout designs. For example, design rules may define the space tolerance between devices or interconnect lines. Once the layout of the circuit has been created, the next step in manufacturing the IC is to transfer the layout onto a semiconductor substrate. Optical lithography or photolithography is a well-known process for transferring geometric shapes onto the surface on a semiconductor wafer. The photolithography process generally begins with the formation of a photoresist layer on the top surface of a semiconductor substrate or wafer. A reticle or mask having fully light non-transmissive opaque regions (which are often formed of chrome) and fully light transmissive clear regions (which are often formed of quartz) is then positioned over the photoresist coated wafer.

The mask is placed between a radiation or light source, which can produce light of a pre-selected wavelength (e.g., ultraviolet light) and geometry, and an optical lens system, which may form part of a stepper apparatus. When the light from the light source is directed onto the mask, the light is focused to generate a reduced mask image on the wafer, typically using the optical lens system, which may contain one or several lenses, filters, and/or mirrors. This light passes through the clear regions of the mask to expose the underlying photoresist layer, and is blocked by the opaque regions of the mask, leaving that underlying portion of the photoresist layer unexposed. The exposed photoresist layer is then developed, typically through chemical removal of the exposed or unexposed regions of the photoresist layer. The end result is a semiconductor wafer coated with a photoresist layer exhibiting a desired pattern, which defines the geometries, features, lines and shapes of that layer. This pattern can then be used for etching underlying regions of the wafer.

As indicated above, technology must provide ground rules to designers on order to ensure that designs passing the defined ground rules are in fact manufacturable. Current processes perform simulations and hardware measurements on limited topologies (e.g., typically varying one parameter) to determine allowed edge relations. However, as the size of design features continues to scale below the wavelength of the patterning light source (a situation that is becoming progressively worse), more of the layout needs to be examined to determine whether the design is manufacturable.

SUMMARY

A method of failure detection of an integrated circuit (IC) layout includes, in an exemplary embodiment, determining, by a computer, a critical path distance between a first geometric feature of the IC layout and a second geometric feature of the IC layout; and comparing, by the computer, the determined critical path distance to a defined minimum (or maximum) critical path distance between the first and second geometric features, wherein the defined minimum critical path distance corresponds to a desired electrical property of the IC layout, independent of any geometric-based ground rule minimum distance for the IC layout; identifying any determined critical path distances that are less than the defined minimum critical path distance as a design violation; and modifying the IC layout by eliminating the identified design violations.

In another embodiment, a method of geometry-based, electrical hotspot detection of an integrated circuit (IC) layout includes performing, by a computer, a first pass hotspot identification of the IC layout, based on one or more geometric-based ground rules, so as to identify potential electrical hotspots; performing a lithography simulation of portions the IC layout identified as potential electrical hotspots from the first pass hotspot identification so as to generate contours; for each identified potential electrical hotspot, determining a critical path distance between a first geometric feature of the IC layout and a second geometric feature of the IC layout; and comparing, by the computer, the determined critical path distance to a defined minimum critical path distance between the first and second geometric features, wherein the defined minimum critical path distance corresponds to a desired electrical property of the IC layout, independent of any geometric-based ground rule minimum distance for the IC layout; identifying any determined critical path distances that are less than the defined minimum critical path distance as a design violation; and modifying the IC layout by eliminating the identified design violations.

BRIEF DESCRIPTION OF THE SEVERAL VIEWS OF THE DRAWINGS

Referring to the exemplary drawings wherein like elements are numbered alike in the several Figures:

FIG. 5($b$) illustrates one embodiment of computing a critical path distance of the polygon of FIG. 5($a$) using the medial axis;

FIG. 5($c$) illustrates another embodiment of computing a critical path distance of the polygon of FIG. 5($c$) using a minimum perimeter distance.

DETAILED DESCRIPTION

In order to ensure the manufacturability of IC layouts, manufacturing "hotspots" are detected and fixed. Generally speaking, a geometry hotspot refers to an identified layout feature which has, for example, a width less than a minimum defined width threshold, or a distance between a pair of layout features that is less than a minimum defined threshold value. Geometry hotspot detection in the design space is done on the drawn shapes, which are typically rectilinear polygons, although it is also a common practice to perform geometry hotspot detection on simulated wafer contours.

In addition to geometry hotspots, electrical hotspots can also be detected. An electrical hotspot refers to a device feature that, when printed, does not meet the prescribed electrical parameter. For example, a transistor having a length L and width W, even when printed to the geometric specification, may not meet an electrical specification. This type of electrical hotspot detection may be performed on simulated wafer contours, with the assistance of a contour-to-electrical mapping tool that translates simulated contours into equivalent rectilinear device parameters such as L and W.

However, one type of potential electrical hotspot detection not presently addressed by conventional approaches relates to effects on transistor performance due to undesired dopant diffusion. For example, in a complementary metal oxide semiconductor (CMOS) technology, a practical device such as a static random access memory (SRAM) cell includes both NFET and PFET devices adjacent to one another. More specifically, such a device includes both P+ and N+ doped regions. Although current design rules specify a minimum absolute spacing between P+/N+ boundary-to-transistor area (mainly for consideration of implant lithography overlay), it is still conceivable that a dopant material of one polarity type could diffuse into an unintended region of the active area and adversely affect the electrical characteristics of a neighboring transistor device.

Figure 1:
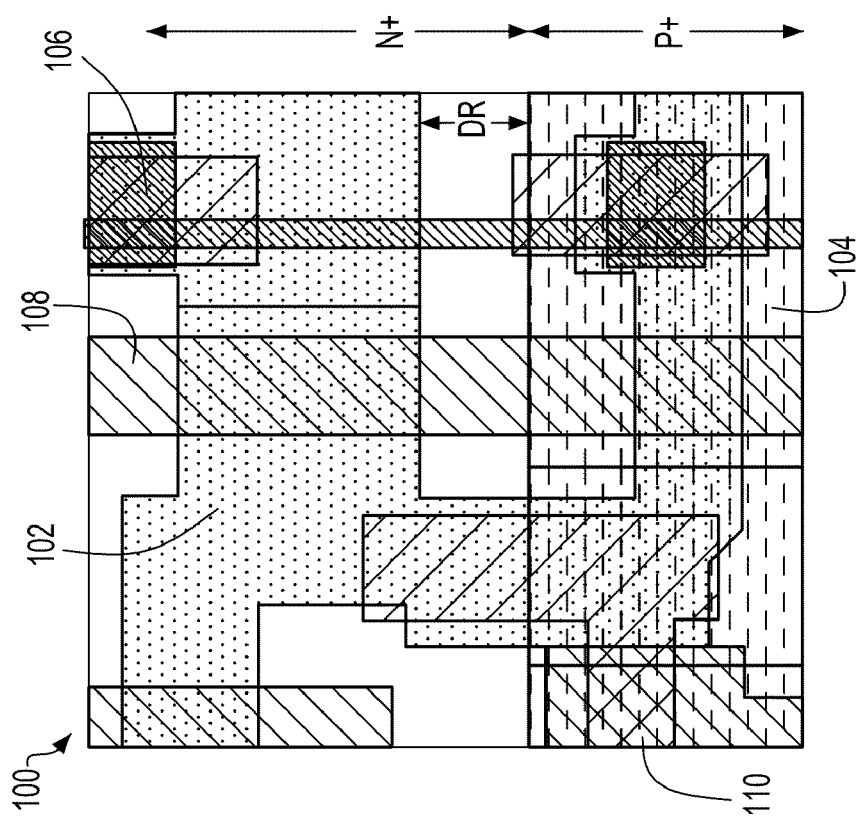
FIG. 1 is a layout view of a portion of an SRAM cell that may be analyzed in practicing embodiments of the invention.

Referring now to FIG. 1, there is shown a layout view of a portion of an SRAM cell 100. As is shown, the layout includes an N+ doped region 102 of the active area, representing source/drain regions for one of the pull down (NFET) transistors of the SRAM cell 100, and a P+ doped region 104 of the active area, representing source/drain regions for one of the pull up (PFET) transistors of the SRAM cell 100. FIG. 1 further depicts the layout of a gate conductor 106 (e.g., polysilicon), contacts 108 to the active areas, and first level (M1) metal contacts 100 for electrically connecting devices, such as the common drain terminal of a pull up/pull down transistor pair, for example.

Figure 2:
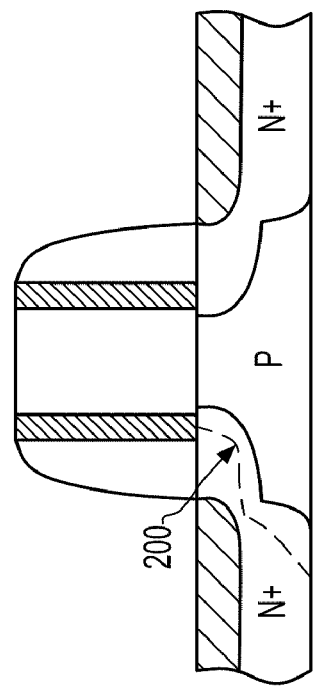
FIG. 2 is a cross-sectional view of the pull down NFET of the SRAM cell of FIG. 1.

As indicated above, current design rules may specify a minimum absolute spacing between P+/N+ boundary-to-transistor area. For example, in FIG. 1, this spacing (DR) between the arrows corresponds to a minimum spacing between the source terminal of the NFET and the source terminal of the PFET. However, as indicated by the curved path of the arrow 112 in FIG. 1, it is possible that a P+ dopant of the PFET (e.g., boron) could diffuse into the nearby NFET and weaken the source/drain junction thereof, if the distance from the edge of the NFET to the PN implant boundary is shorter than a given threshold. This in turn may cause the pull down NFET to act like a PN junction and the SRAM cell 100 to fail. Schematically, this diffusion is further illustrated in FIG. 2, which is a cross-sectional view of the pull down NFET of the SRAM cell 100. The dashed line 200 in FIG. 2 represents a shift in the N+/P boundary of the NFET, weakening the NFET extension implant. This type of diffusion failure has been a major yield detractor for a 65 nm product SRAM design.

Accordingly, disclosed herein is a method and system for implementing failure detection of integrated circuit layouts through a geometry-based, electrical hotspot detection technique. Rather than a traditional focus on direct spacing, such as used for geometry hotspot detection, a "critical path" spacing is defined and determined herein with respect to potential electrical hotspot problem. For example, in the case of diffusion, it is not the direct spacing between dopant regions that is necessarily the key parameter, but rather it is the dopant diffusion path for rounded diffusion patterns that determines potential electrical hotspots. Another example of an electrical hotspot critical path could be an electrically conducting path that creates charging problems. Thus, even though a layout feature may meet a geometry-based ground rule (e.g., a minimum absolute spacing between dopant material boundaries and transistor areas), the feature may nonetheless present a problem from an electrical standpoint (e.g., diffusion). As such, the defined minimum critical path distance corresponds to a desired electrical property of the IC layout, independent of any geometric-based ground rule minimum distance for the IC layout.

Figure 3:
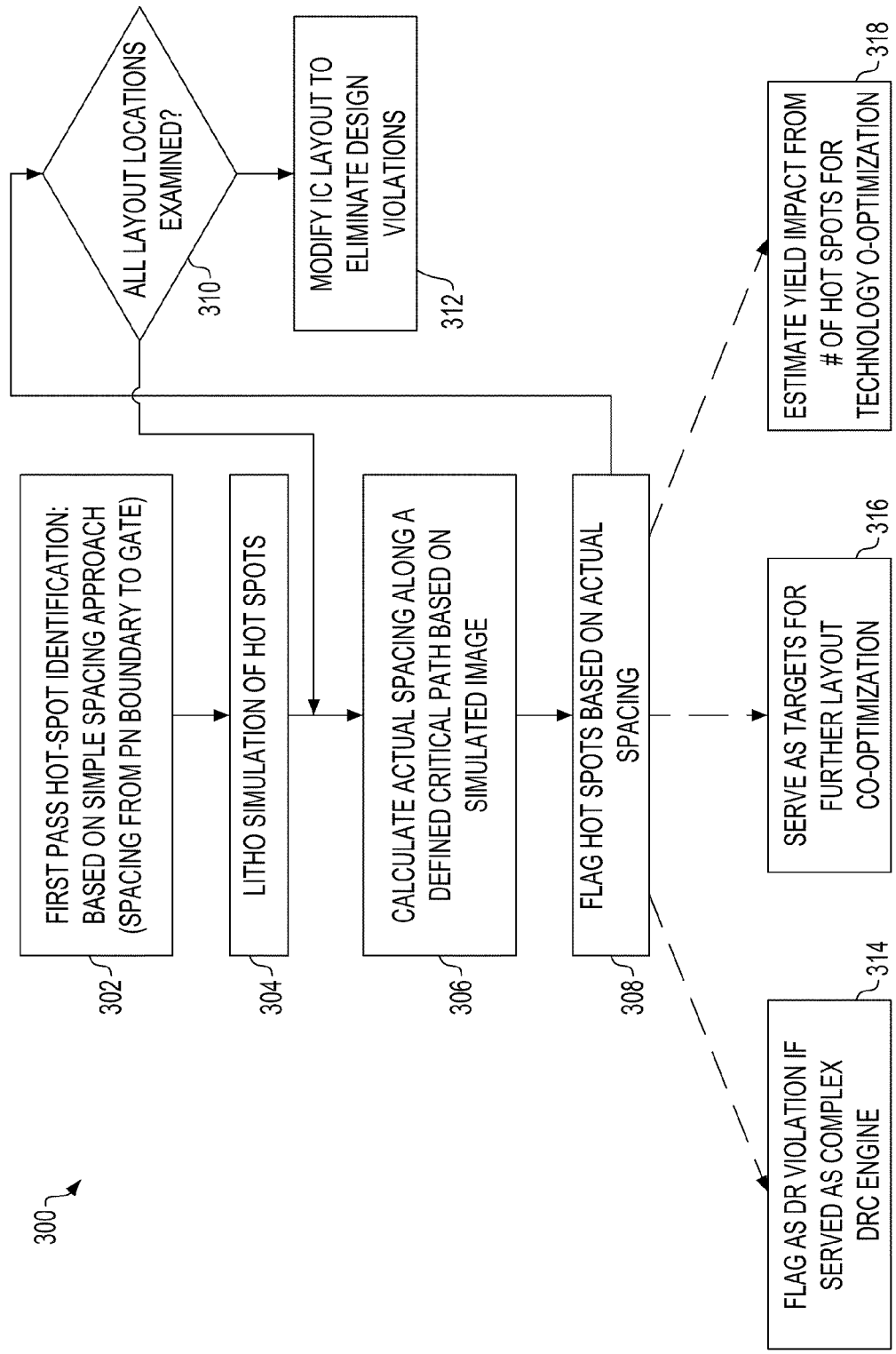
FIG. 3 is a process flow diagram depicting a geometry-based, electrical hotspot detection method, in accordance with an embodiment of the invention.
Figure 4:
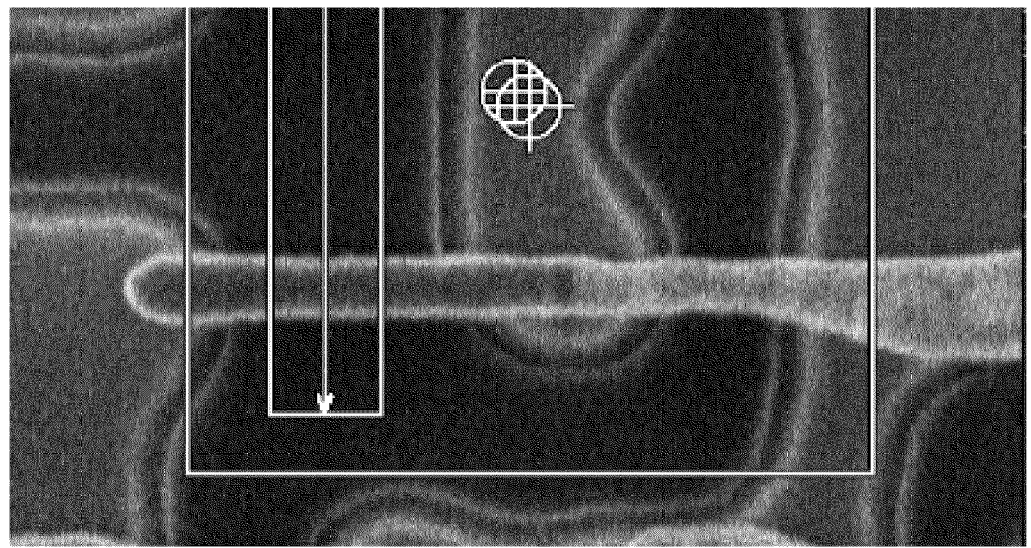
FIG. 4 is a lithographic simulation image of the SRAM cell of FIG. 1.
Figure 4:
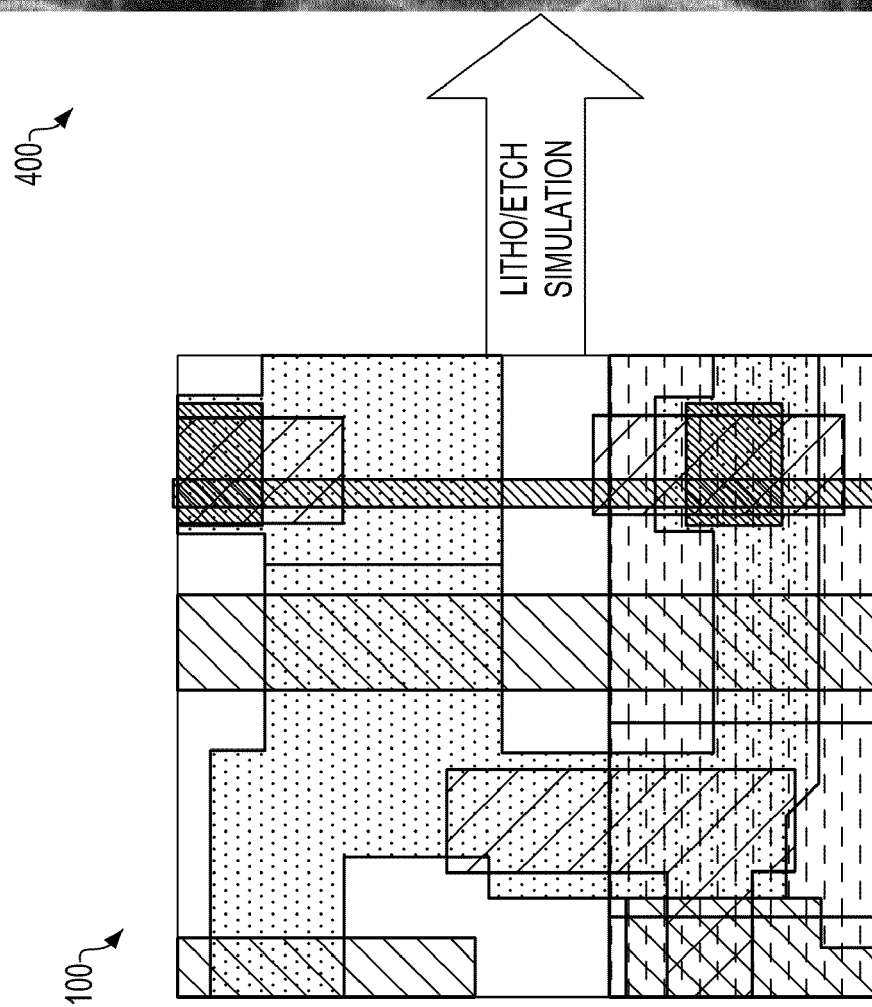

Stated another way, the present exemplary embodiments describe an electrical property in terms of geometry measurement and thus detect electrical hotspots by geometrical measurement of circuit layouts simulated in lithography/etching. Referring now to FIG. 3, there is shown a process flow diagram 300 depicting a geometry-based, electrical hotspot detection technique. As shown in block 302, a first pass hotspot identification technique, based on a simple spacing (geometric-based ground rules) approach is used to identify potential hotspots for further examination. Using the above SRAM cell example, the first pass could be based on the PN boundary to gate spacing. Any such potential hotspots identified from the first pass technique in block 302 are then simulated in lithography, as indicated in block 304. For the specific SRAM cell example of FIG. 1, the resulting lithographic simulation 400 is illustrated in FIG. 4.

Referring once again to FIG. 3, the actual spacing along a defined critical path of the simulated image(s) is then calculated, as shown in block 306. Again, in the example presented, this defined critical path is from the perspective of an electrical property under study, such as the shortest diffusion path between boundaries of opposite polarity types. Based on the determined actual spacing of the defined critical path, any electrical hotspots are flagged and identified, as reflected in block 308. In decision block 310, the processes of blocks 306 and 308 are repeated until all layout locations have been examined. At this point, the identified hotspot information is then used to modify the IC layout to eliminate the identified design violations, as shown in block 312.

The geometry-based, electrical hotspot information obtained in block 308 may be applied in any of a number of useful applications. For example, as shown in block 314, the hotspot detection technique can also be incorporated into a design rules check (DRC) engine such that a determined electrical hotspot in this manner constitutes a design rules violation. Also, such information can be returned to a circuit designer to serve as targets for further layout co-optimization, as shown in block 316. In addition (or in the event that a given layout is not improvable), the electrical hotspot information may be used to estimate the impact on device yield based on the number of hotspots detected, for technology co-optimization, as shown in block 318.

With respect to the computation of the critical path distance (block 306), one contemplated embodiment involves polygon/contour medial axis tracing. For example, FIG. 5(a) illustrates an exemplary polygon 500 and its medial axis 502 (dashed lines). In FIG. 5(b), the distance of the defined critical path (e.g., dopant diffusion path) for the polygon 500 is defined by the medial axis path 504 between a first darkened edge 506 (e.g., representing the P+ region of one transistor) and a second darkened edge 508 (e.g., representing the N+ region of another transistor), plus end adjustments from the endpoints of the medial axis path 504 to the edges 506, 508.

Figure 5C:
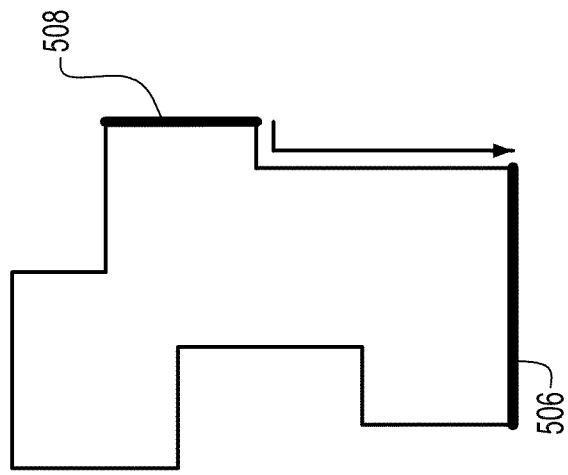
FIG. 5($a$) illustrates an exemplary polygon and its medial axis.
Figure 5B:
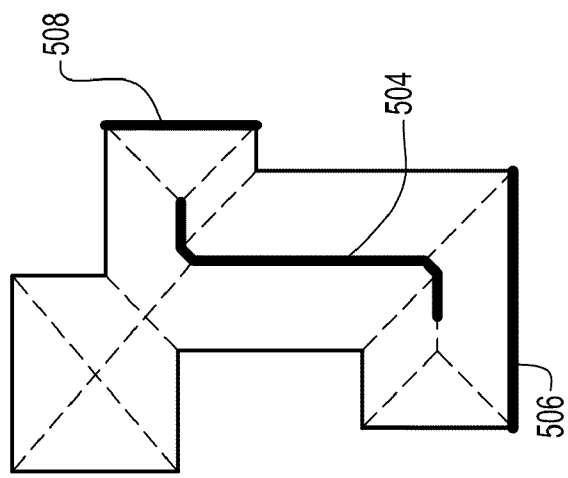
Figure 5A:
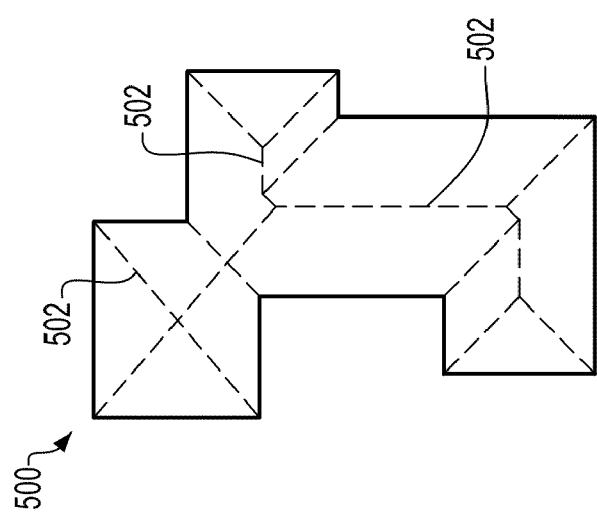

Alternatively, in another embodiment, the defined critical path distance path may be determined by computing the minimum perimeter distance between the two edges 506, 508, as shown by the arrow in FIG. 5(c). As indicated above, in order to obtain a more accurate characterization, a litho simulation can be performed to produce a wafer contour such as shown in FIG. 4, and the defined critical path length may be computed from the contour, using the medial axis of the contour.

Figure 6:
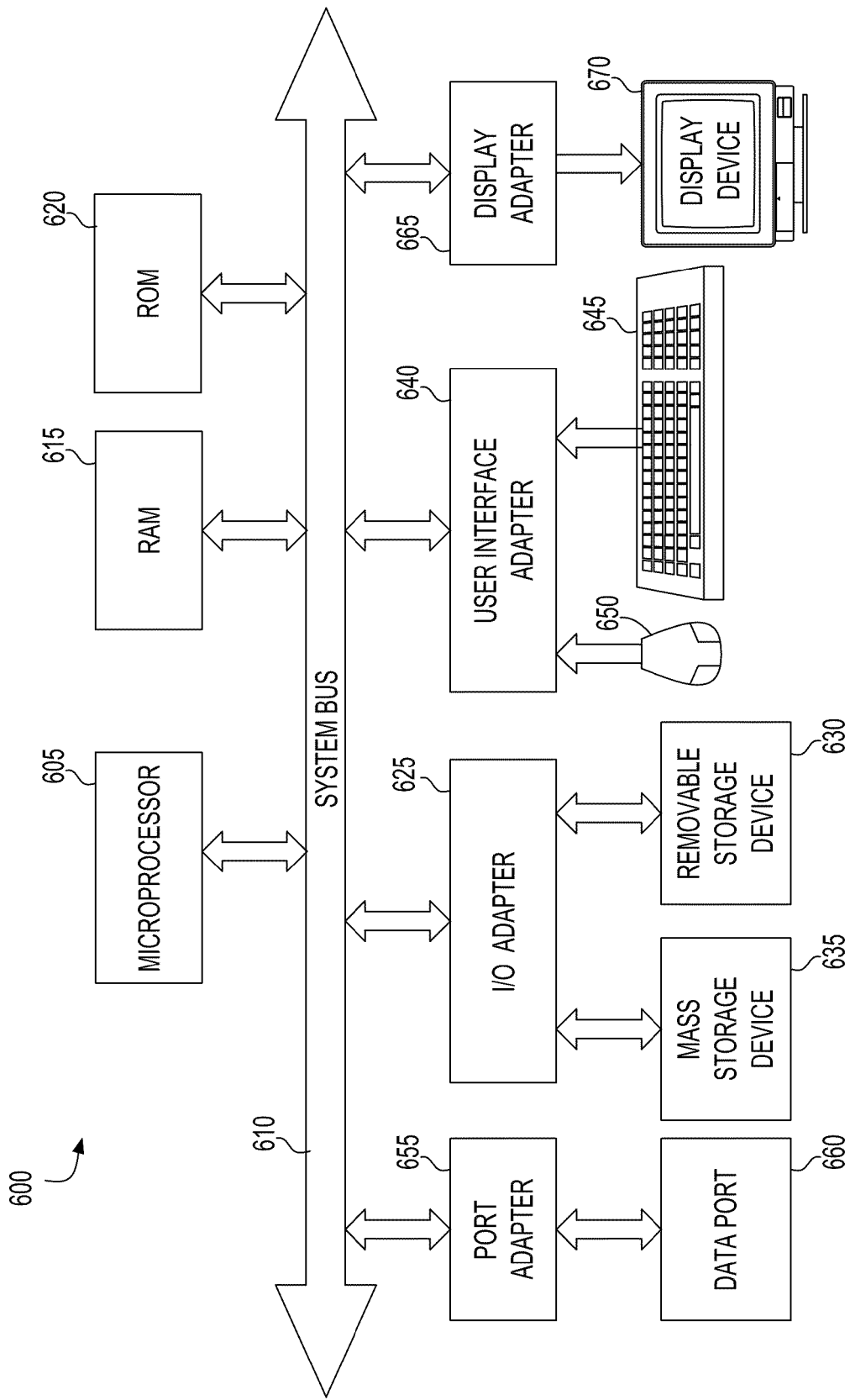
FIG. 6 is a schematic block diagram of a general-purpose computing system suitable for practicing embodiments of the present invention.

Generally, the method embodiments for implementing failure detection of integrated circuit layouts through a geometry-based, electrical hotspot detection technique may be practiced with a general-purpose computer, and the method may be coded as a set of instructions on removable or hard media for use by the general-purpose computer. FIG. 6 is a schematic block diagram of a general-purpose computing system suitable for practicing embodiments of the present invention. In FIG. 6, computing system 600 has at least one microprocessor or central processing unit (CPU) 605. CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a user interface adapter 640 for connecting a keyboard 645 and a mouse 650, a port adapter 655 for connecting a data port 660 and a display adapter 665 for connecting a display device 670.

ROM 620 contains the basic operating system for computing system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other user input devices such as trackballs, writing tablets, pressure pads, microphones, light pens and position-sensing screen displays may be connected to user interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1-5.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of failure detection of an integrated circuit (IC) layout, the method comprising:
   determining, by a computer, a critical path distance between a first geometric feature of the IC layout and a second geometric feature of the IC layout; and
   comparing, by the computer, the determined critical path distance to a defined minimum critical path distance between the first and second geometric features, wherein the defined minimum critical path distance corresponds to a desired electrical property of the IC layout, independent of any geometric-based ground rule minimum distance for the IC layout;
   identifying any determined critical path distances that are less than the defined minimum critical path distance as a design violation; and
   modifying the IC layout by eliminating the identified design violations.

2. The method of claim 1, wherein determining the critical path distance further comprises computing a polygon medial axis between an edge of the first geometric feature and an edge of the second geometric feature.

3. The method of claim 1, wherein determining the critical path distance further comprises computing a minimum perimeter distance of a polygon including an edge of the first geometric feature and an edge of the second geometric feature.

4. The method of claim 1, wherein the desired electrical property comprises diffusion of dopant material from a semiconductor region of a first polarity type to a semiconductor region of a second polarity type.

5. The method of claim 1, further comprising performing a lithography simulation of the IC layout so as to generate contours for the first and second geometric features.

6. The method of claim 5, wherein determining the critical path distance further comprises computing a contour medial axis between the first geometric feature and the second geometric feature.

7. The method of claim 5, wherein determining the critical path distance further comprises computing a minimum contour perimeter distance between the first geometric feature and the second geometric feature.

8. The method of claim 1, further comprising incorporating any determined electrical hotspot identification into a design rules check (DRC) engine that designates any electrical hotspots a design rules violation.

9. The method of claim 1, further comprising utilizing any determined electrical hotspot identification as targets for layout optimization.

10. The method of claim 1, further comprising utilizing any determined electrical hotspot identification to estimate impact on IC yield, based on the number of electrical hotspots detected.

\* \* \* \* \*